Patented Nov. 26, 1935

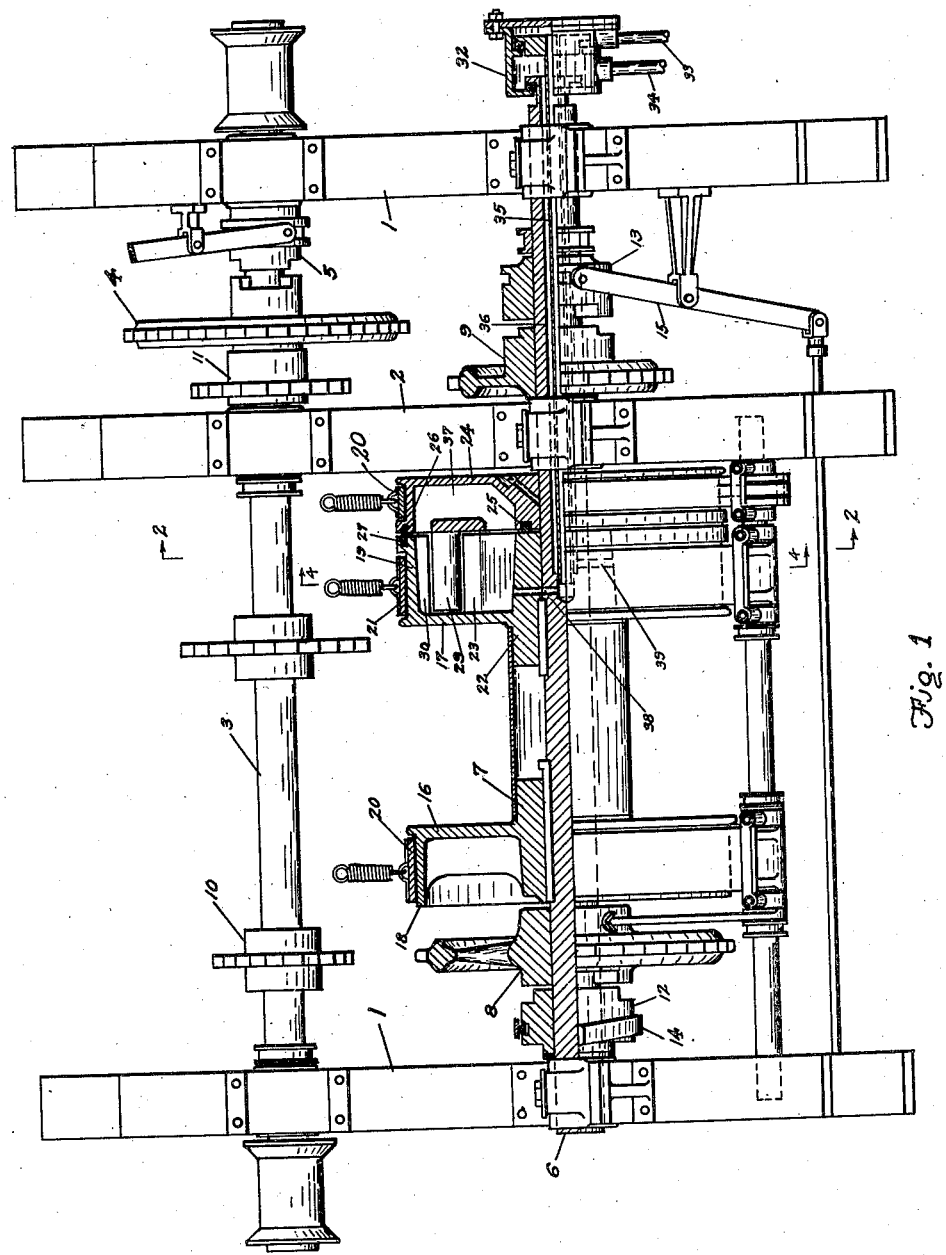

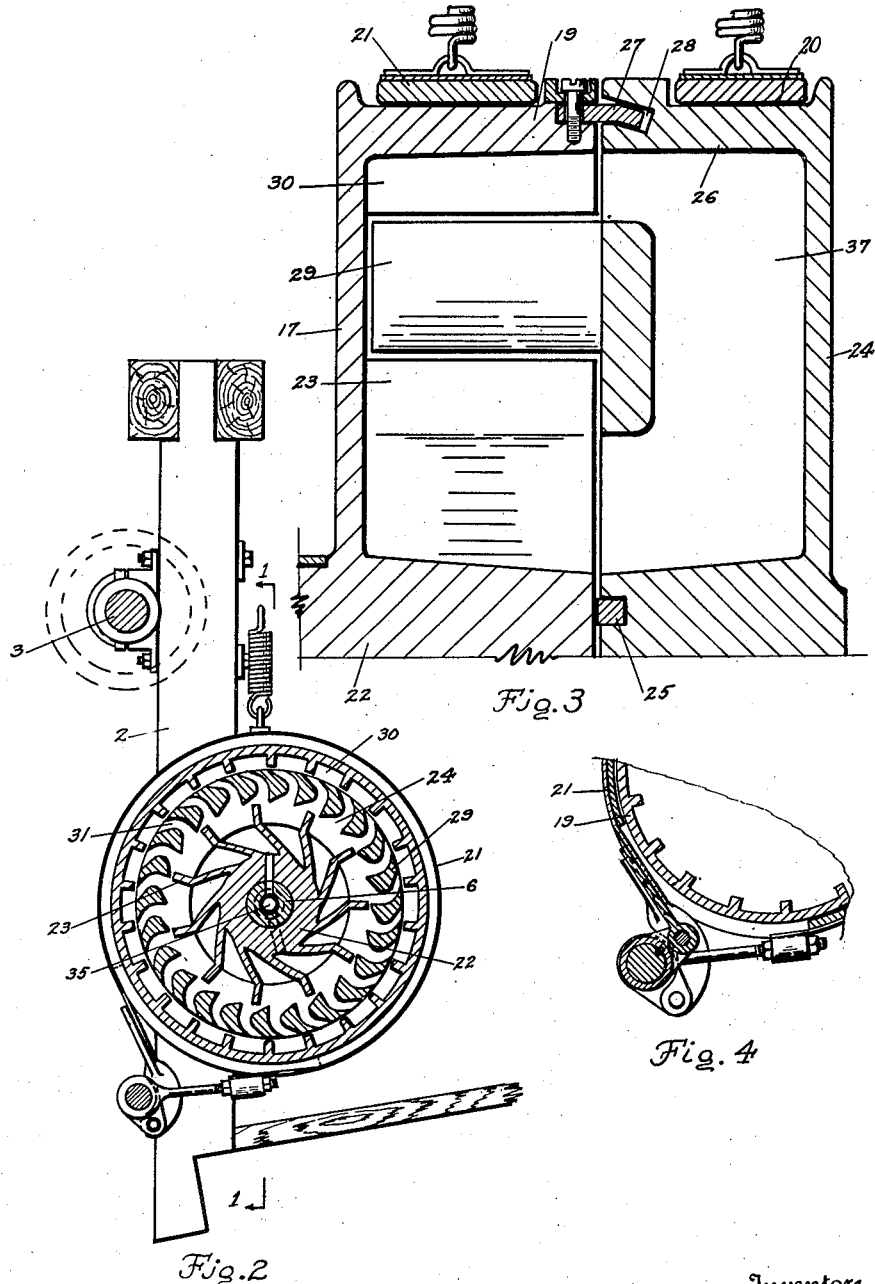

2,021,880

UNITED STATES PATENT OFFICE 2,021,880

HYDRAULIC BRAKE

Rexford O. Anderson, Houston, Tex., and Amon H. Carson, Oklahoma City, Okla.

Application December 16, 1932, Serial No. 647,578

14 Claims. (Cl. 188—90)

This invention relates to a hydraulic brake.

An object of the invention is to provide a hydraulic brake mechanism or governor specially designed for use to control the drum of the draw works of a rotary drilling rig.

In carrying on drilling operations a draw works is employed which includes a cable winding drum and which is used for lowering the drill pipe, or other pipe, into the well, and for withdrawing the same.

At the present time this drum is controlled by manually operable brakes by means of which the descent of the load into the well is controlled.

It is an object of this invention to provide also hydraulic brake mechanism for relieving the manual brakes of part of the work to which the latter would be subjected and whereby the heavy load to be lowered may be let down into the bore smoothly and with a minimum of vibration thus relieving the wear on the manual brakes and relieving the drilling line of the sudden stress to which it would be subjected were manual brakes only employed.

Another object of the invention is to provide a hydraulic brake mechanism for draw works whereby the load may be gradually lowered at a uniform speed so that the drill pipe will not be subjected to vibrations or whipping and may be lowered at a moderate rate of speed to the end that the drilling fluid in the well will not be subjected to a high velocity in passing up past the drill and drill stem as would be the case were the drill pipe lowered rapidly and the walls of the well will thus be protected against caving or injury due to the whipping of the pipe being lowered or to the high velocity of the drilling fluid which would result in the caving of the walls of the well.

A further object of the invention is to provide apparatus of the character described wherein the brake surface will be kept cool and the brake lining be protected against excessive wear and excessive heat.

A further object of the invention is to provide a hydraulic brake mechanism that may be cheaply and easily constructed, readily installed and kept in repair and which may be safely and easily operated.

With the above and other objects in view the invention has particular relation to certain novel features of construction, operation and arrangement of parts, an example of which is given in this specification and illustrated in the accompanying drawings, wherein:—

Figure 1 shows an elevational view of a drilling rig embodying the invention and shown partly in section taken on the line 1—1 of Figure 2.

Figure 2 shows a cross sectional view taken on the line 2—2 of Figure 1.

Figure 3 shows an enlarged fragmentary cross sectional view of the hydraulic brake mechanism as taken on the line 1—1 of Figure 2.

Figure 4 shows a cross sectional view on the line 4—4 of Figure 1.

Referring now more particularly to the drawings wherein like numerals of reference designate similar parts in each of the figures, the numeral 1, 1 designates the upstanding side members of the frame work of the draw works of the drilling rig. The numeral 2 designates an intermediate upstanding member forming part of said frame. Mounted in suitable bearings in this frame there is the transverse drive shaft 3 which may be driven from a suitable power by means of a sprocket chain which operates over the driving sprocket wheel 4 loosely mounted on said shaft and which may be clutched therewith and declutched therefrom by the clutch 5. There is also mounted in said frame a drum shaft 6 arranged parallel with the shaft 3 and splined on this last mentioned shaft there is the cable winding drum 7. Loosely mounted on the shaft 6 adjacent the respective ends of the drum 7 are the low speed and high speed sprockets 8, 9, aligned with the respective sprockets 10, 11, which are fixed on the shaft 3. It is understood that sprocket chains will operate over the respective pairs of sprockets 8, 10 and 9, 11. These sprocket chains have not been shown for the sake of clearness. Splined on the shaft 6 there are the clutches 12, 13 adapted to be clutched with or declutched from the corresponding sprocket wheels 8, 9 in the conventional way as by means of the shift levers 14, 15.

The drum 7 has the circular ends 16, 17 which in turn have the outwardly turned flanges 18, 19 around which the brake bands 20 and 21 are disposed. These brake bands may be operated in the conventional manner to control the operation of the drum 7. In use a cable is wound on the drum 7 and is threaded through the crown block of the derrick and supports the load being lowered into the well. As draw works are at present constructed the descent of the load into the well is controlled solely by the manually operable brakes and the rapid descent of the drill pipe causes the drilling fluid in the well beneath to pass upwardly at a high velocity causing caving of the walls of the well, also causing a whipping and vibration of the drill pipe due to the fact that the gripping of the brake band with the brake surface of the drum is not uniform so that the load is not lowered at a uniform speed.

In the present construction the hub 22 of the end 17 of the drum is provided with the radial blades or impellers 23 which are preferably formed integrally with said hub and also with the adjacent end 17. These baffles are inclined rearwardly but their outer ends are turned into an approximately radial direction. The numeral 24 designates a brake drum which is loosely mounted on the shaft 6 adjacent the outer end of the hub 22 and which fits closely thereagainst and between which there is the packing ring 25. The outer margin of the drum 24 has the inwardly turned annular flange 26, aligned with the flange 19. The joint between these flanges 19, 26 is broken by the non-metallic packing strip 27 which is attached to the flange 19 and which projects into a deep groove 28 in the adjacent margin of the flange 26. The drum 24 has a series of inside baffles 29 which project inwardly and are arranged around the outer ends of the baffles 23 as more clearly shown in Figures 1 and 3. The inner side of the flange 19 has the channels 30 extending from the end 17 outwardly to the margin of the flange 19 and the baffles 29 are shaped to provide the rearwardly curved channels 31 between them, leading into the channels 30.

On one end of the shaft 6 there is mounted a swivelling connection 32 into which are connected the inlet line 33 and the outlet line 34. This last mentioned end of the shaft 6 is formed tubular and telescoped within said tubular end there is the inlet tube 35 with which the pipe 33 is connected and around the tube 35 there is an outlet conduit 36 with which the outlet pipe 34 is connected. The drum 24 and the complemental parts of the end 17 of the drum 7 form an annular enclosed chamber 37 having an inlet duct 38 with which the tube 35 is connected and through which the water or other fluid employed may be introduced into the chamber 37 and leading from the said chamber there is an outlet duct 39 leading into the conduit 36.

In operation fluid preferably cold water is forced through the pipe 33 and the tube 35 through the duct 38 into the chamber 37 which is maintained constantly filled with the water and from this chamber the water flows through the duct 39 and conduit 36 out through the outlet pipe 34 thus maintaining the chamber 37 constantly filled with circulating water which will keep the brake surfaces cool.

With the drum 24 held by its brake 20 against rotation it is obvious that the rotation of the impellers 23, as shown in Figure 2, in a clockwise direction as the load descends will be controlled by the resistance of the baffles 23 against the confined water and this water will be forced through the reversely inclined channels formed between baffles 29 into the channels 30 and thence back around through chamber 37 thus impeding the rotation of the drum 7 and causing the load to be lowered gradually and smoothly into the well. In case it is desired to stop the descent the brakes 20, 21 may be applied for that purpose so that the manually operated brakes will be relieved of the work of controlling the speed of descent of the load. At low speed the drum 24 should be held stationary but if it be desired to increase the speed said drum may be permitted to rotate and the speed of the movement of the load thus controlled from low speed with the drum 24 stationary to high with the drum 24 released to freely rotate.

The drawings and description disclose what is now considered to be a preferred form of the invention by way of illustration only while the broad principle of the invention will be defined by the appended claims.

What we claim is:

1. Brake mechanism comprising a shaft, a drum fixed thereon and a drum loosely mounted thereon, said drums being adjacent and being formed to provide a chamber between them, means for manually braking said loosely mounted drum, means for supplying liquid into and for relieving the same from said chamber, baffles in said chamber fixed to one drum and impellers in the chamber fixed to the other drum, said baffles and impellers being effective to retard the relative rotation of said drums.

2. Brake mechanism comprising two relatively rotatable drums arranged adjacent and formed to provide a chamber between them, means for circulating a liquid through said chamber said circulation means including impellers in said chamber fixed to one drum, baffles in the chamber arranged to cooperate with the impellers and fixed to the other drum.

3. Brake mechanism comprising two relatively rotatable drums arranged adjacent and formed to provide a chamber between them, means for circulating a liquid through said chamber said circulating means including impellers in said chamber fixed to one drum, baffles in the chamber arranged to cooperate with the impellers and fixed to the other drum, and brake means for controlling and preventing the rotation of one of said drums.

4. Brake mechanism comprising two relatively rotatable drums arranged adjacent and formed to provide a chamber between them, means for circulating a liquid through said chamber said means including impellers in said chamber fixed to one drum, baffles in the chamber arranged to cooperate with the impellers and fixed to the other drum, brake means for controlling and preventing the rotation of one drum and load handling means fixed to the other drum.

5. Apparatus of the character described comprising a drum shaft, a drum fixed thereon, a floating drum associated with said shaft, said drums being shaped and arranged to form a chamber between them for containing liquid, a series of baffles and a series of impellers disposed, one series about the other, in said chamber one series being fixed to one drum and the other series being fixed to the other drum, said baffles and impellers being arranged to cause said liquid to circulate in the chamber, brake means for controlling the movement of the floating drum.

6. Apparatus of the character described comprising a drum shaft, a drum fixed thereon, a floating drum, said drums being shaped and arranged to form a chamber between them for containing a liquid, a series of baffles and a series of impellers arranged to cooperate within said chamber one series being fixed to one drum and the other series being fixed to the other drum, brake means for controlling the movement of the floating drum, and manually controllable brake means for application to said fixed drum.

7. Apparatus of the character described comprising a drum shaft, a drum fixed thereon, a floating drum on said shaft, said drums being shaped and arranged to form a chamber between them for containing a liquid, a series of baffles and a series of impellers disposed in said chamber one series being fixed to one drum and the other series being fixed to the other drum, brake means for controlling the movement of the floating drum, and means for permitting the circulation of said liquid through said chamber.

8. A brake mechanism comprising two relatively rotatable drums arranged adjacent and formed to provide a chamber between them for containing a liquid, and means carried by said respective drums through which the confined liquid may be circulated in the chamber to affect the relative rotation of said drums.

9. Brake mechanism comprising two relatively rotatable drums arranged adjacent and formed to provide a closed chamber between them for containing a liquid, impellers in said chamber fixed to one drum, baffles in the chamber arranged to cooperate with the impellers and fixed to the other drum, said impellers and baffles being effective to cause the circulation of the liquid in the chamber, and load handling means carried by one of said drums.

10. Brake mechanism comprising a shaft, a drum fixed thereon, a floating drum, said drums being adjacent and being formed to provide a chamber between them, means for manually braking said floating drum, means for supplying liquid into and for leading the same from said chamber, baffles in said chamber fixed to one drum and impellers in the chamber fixed to the other drum, said baffles and impellers being effective to retard the relative rotation of said drums.

11. Brake mechanism comprising two relatively rotatable drums arranged adjacent and formed to provide a chamber between them, impellers in said chamber fixed to one drum, baffles in said chamber fixed to the other drum, said baffles and impellers forming means for circulating a liquid through said chamber.

12. Brake mechanism comprising two relatively rotatable drums arranged adjacent and formed to provide a chamber between them, impellers in said chamber fixed to one drum, baffles in the chamber fixed to the other drum, said impellers and baffles being arranged to cause the circulation of a liquid through the chamber and brake means for controlling and preventing the rotation of one of said drums.

13. Brake mechanism comprising two relatively rotatable drums arranged adjacent and formed to provide a chamber between them for containing a liquid, impellers in said chamber fixed to one drum, baffles in the chamber fixed to the other drum, said impellers and baffles being arranged to cause the circulation of said liquid through said chamber, brake means for controlling and preventing the rotation of one drum and load handling means fixed to the other drum.

14. Brake mechanism having two relatively rotatable parts, one part comprising a hollow drum, and the other part being associated with the drum and arranged, with respect to the drum, to form an enclosed chamber, a series of impellers in the chamber, a series of baffles in the chamber, said impellers and baffles being fixed one series to the drum and the other series to the other part, and means for permitting the circulating of a liquid through the chamber during relative rotation of the drum and enclosing means.

REXFORD O. ANDERSON.
AMON H. CARSON.